(12) United States Patent
Ouchi

(10) Patent No.: US 9,024,260 B2
(45) Date of Patent: May 5, 2015

(54) TERAHERTZ WAVE GENERATION ELEMENT, TERAHERTZ WAVE DETECTION ELEMENT, AND TERAHERTZ TIME DOMAIN SPECTROSCOPE DEVICE

(75) Inventor: Toshihiko Ouchi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 13/641,544

(22) PCT Filed: May 30, 2011

(86) PCT No.: PCT/JP2011/062858
§ 371 (c)(1),
(2), (4) Date: Oct. 16, 2012

(87) PCT Pub. No.: WO2011/152542
PCT Pub. Date: Dec. 8, 2011

(65) Prior Publication Data
US 2013/0037721 A1    Feb. 14, 2013

(30) Foreign Application Priority Data

Jun. 3, 2010   (JP) .................................. 2010-127891
May 10, 2011   (JP) .................................. 2011-104803

(51) Int. Cl.
*G02F 1/365* (2006.01)
*G02F 1/35* (2006.01)

(52) U.S. Cl.
CPC .............. *G02F 1/365* (2013.01); *G02F 1/3534* (2013.01); *G02F 2203/13* (2013.01); *G02F 2203/07* (2013.01); *G02F 2203/22* (2013.01)

(58) Field of Classification Search
CPC .... G02F 2203/13; G02F 1/3534; G02F 1/365
USPC ........................................................ 250/341.8
See application file for complete search history.

(56) References Cited

U.S. PATENT DOCUMENTS 7,858,940 B2   12/2010   Ouchi ...................... 250/341.1
8,305,679 B2   11/2012   Kondo et al.
(Continued)

FOREIGN PATENT DOCUMENTS

JP   2004-295089 A   10/2004
JP   2008-020268 A    1/2008
(Continued)

OTHER PUBLICATIONS

Hebling et al., "Generation of high-power terahertz pulses by tilted-pulse-front excitation and their application possibilities", *J. Opt. Soc. Am. B*, vol. 25, No. 7, pp. B6-B19 (2008).
(Continued)

*Primary Examiner* — Constantine Hannaher
(74) *Attorney, Agent, or Firm* — Fitzpatrick, Cella, Harper & Scinto

(57) ABSTRACT

A terahertz wave generation element is provided, which includes: an optical waveguide including a core of electro-optic crystal; an optical coupler for extracting a terahertz wave generated from the optical waveguide when light propagates in the optical waveguide to a space; and a reflecting layer disposed on the opposite side to the optical coupler with respect to the core of the optical waveguide, so as to reflect the generated terahertz wave. According to the element, it is possible to provide a generation element that can generate a relatively high intensity terahertz wave efficiently by photo-excitation or generate a terahertz wave having a relatively narrow pulse width, so as to flexibly control waveform shaping of the generated terahertz wave.

18 Claims, 8 Drawing Sheets

(56) References Cited

U.S. PATENT DOCUMENTS

| | | | |
|---|---|---|---|
| 8,384,989 B2 | 2/2013 | Kondo et al. | |
| 2006/0268945 A1 | 11/2006 | Minamide et al. | |
| 2008/0315216 A1* | 12/2008 | Otsuji et al. | 257/83 |
| 2010/0084570 A1* | 4/2010 | Katagiri | 250/458.1 |
| 2011/0012036 A1* | 1/2011 | Gordon et al. | 250/493.1 |
| 2013/0181146 A1 | 7/2013 | Shiota et al. | |

FOREIGN PATENT DOCUMENTS

| | | |
|---|---|---|
| JP | 2010-204488 | 9/2010 |
| WO | WO 2008/025746 | 3/2008 |

OTHER PUBLICATIONS

K. Suizu et al., "Extremely Frequency-Widened Terahertz Wave Generation Using Cherenkov-Type Radiation", *Opt. Express*, vol. 17, No. 8, pp. 6676-6681 (Apr. 7, 2009), XP002638793.

M. Theuer et al., "Efficient Generation of Cherenkov-Type Terahertz Radiation from a Lithium Niobate Crystal with a Silicon Prism Output Coupler", *Applied Physics Letters*, vol. 88, pp. 71122-071122 (Feb. 17, 2006), XP012082835.

S. Bodrov et al., "Efficient Cherenkov Emission of Terahertz Radiation from an Ultrashort Laser Pulse Propagating along a Waveguiding Structure with Nonlinear Core", *Infrared and Millimeter Waves*, pp. 194-195 (2007), XP031249558.

M. Li et al., "Time-Domain Dielectric Constant Measurement of Thin Film in GHz-THz Frequency Range near the Brewster Angle", *Applied Physics Letters*, vol. 74, No. 15, pp. 2113-2115 (Apr. 12, 1999), XP012022379.

Bodrov et al., "Highly efficient optical-to-terahertz conversion in a sandwich structure with LiNbO3 core," Optics Express, vol. 17, No. 3, pp. 1871-1879 (2009).

VanEngen Spivey et al., "Brewster's angle attenuator for terahertz pulses," Applied Optics, vol. 41, No. 36, pp. 7637-7643 (2002).

Bakunov et al., "Si-LiNbO3-air-metal structure for concentrated terahertz emission from ultrashort laser pulses," Applied Physics B, Lasers and Optics, vol. 98, No. 1, pp. 1-4 (2010).

European Communication issued in counterpart application No. 11727806.9 dated Apr. 9, 2014—8 pages.

Extended European Search Report issued in counterpart application No. 13177405.1 dated Apr. 10, 2014—14 pages.

Mun et al., "Observation of Intense Terahertz Radiation from a Laser-Produced Relativistic Plasma Generated on Metal and Plastic Solid Targets," Journal of the Korean Physical Society, vol. 51, No. 1, pp. 421-425 (2007).

Bakunov et al., "Cherenkov emission of terahertz surface plasmon polaritons from a superluminal optical spot on a structured metal surface," Optics Express, vol. 17, No. 11, pp. 9323-9329 (2009).

Chinese Office Action issued in counterpart application No. 201180026344.4 dated Nov. 2, 2014, along with its English-language translation (24 pages).

Japanese Office Action issued in counterpart application No. 2011-104803 dated Feb. 24, 2015, along with its English-language translation (6 pages).

* cited by examiner

TERAHERTZ WAVE GENERATION ELEMENT, TERAHERTZ WAVE DETECTION ELEMENT, AND TERAHERTZ TIME DOMAIN SPECTROSCOPE DEVICE

TECHNICAL FIELD

The present invention relates to a terahertz wave generation element that generates a terahertz wave containing electromagnetic wave components in a frequency range from a millimeter wave band to a terahertz wave band (30 GHz to 30 THz), a terahertz wave detection element that detects a terahertz wave, and a terahertz time domain spectroscope device that uses at least one of the terahertz wave generation element and the terahertz wave detection element. In particular, the present invention relates to a generation element including an electro-optic element that generates or detects an electromagnetic wave containing Fourier components in the above-mentioned frequency band by laser beam irradiation, and a tomography device or the like employing the terahertz time domain spectroscopy (THz-TDS) using the generation element.

BACKGROUND ART

In recent years, a nondestructive sensing technology using a terahertz wave has been developed. As an application field of an electromagnetic wave having this frequency band, there is an imaging technology with a safe fluoroscopy device instead of an X-ray equipment. In addition, there have been developed a spectral technology for investigating physical properties such as a molecular binding state by determining absorption spectrum and complex permittivity inside a substance, a measurement technology for investigating physical properties such as carrier density, mobility, and conductivity, and an analysis technology of biomolecules. As a method of generating a terahertz wave, a method of using a nonlinear optical crystal is widely used. Typical nonlinear optical crystals include $LiNbO_x$ (hereinafter, also referred to as LN), $LiTaO_x$, $NbTaO_x$, KTP, DAST, ZnTe, GaSe, GaP, CdTe, and the like. A secondary nonlinear phenomenon is used for generating a terahertz wave. As the method, there are known a difference-frequency generation (DFG) using incidence of two laser beams having a frequency difference. In addition, there are known a method of generating a single color terahertz wave by an optical parametric process and a method of generating a terahertz pulse by optical rectification with irradiation of a femtosecond pulse laser beam.

As a process of generating a terahertz wave from a nonlinear optical crystal in this way, an electrooptic Cerenkov radiation has been noted recently. This is a phenomenon in which, as illustrated in FIG. 9, a terahertz wave 101 is radiated in a conical manner like a shock wave in a case where a propagation group velocity of a laser beam 100 as an excitation source is faster than a propagation phase velocity of the generated terahertz wave. A radiation angle θc of the terahertz wave is determined by the following equation according to a ratio of refractive index in the medium (nonlinear optical crystal) between light and the terahertz wave.

$$\cos \theta c = v_{THz}/v_g = n_g/n_{THz}$$

where a group velocity and a group refractive index of the laser beam are denoted by $v_g$ and $n_g$, respectively. A phase velocity and a refractive index of the terahertz wave are denoted by $v_{THz}$ and $n_{THz}$, respectively. Up to now, there has been reported that a high intensity terahertz pulse is generated by optical rectification using the Cerenkov radiation phenomenon by causing a femtosecond laser beam with inclined wavefront to enter LN (see Non Patent Literature 1). In addition, there has been reported that a single color terahertz wave is generated by a DFG method using a slab waveguide having a thickness sufficiently smaller than the wavelength of the generated terahertz wave in order to eliminate the necessity of the wavefront inclination (see Patent Literature 1 and Non Patent Literature 2).

The examples of Patent Literature 1, Non Patent Literature 1, and Non Patent Literature 2 are related to a proposal of, since the terahertz wave is generated by progressive wave excitation in those examples, improving extraction efficiency by enhancing terahertz waves generated by different wave sources by each other with phase matching in the radiation direction. Features of this radiation method include the fact that a high intensity terahertz wave can be generated with relatively high efficiency as the ones using a nonlinear optical crystal, and the fact that a terahertz wave band can be widened when absorption in the terahertz region due to phonon resonance unique to the crystal is selected on the high frequency side. In those technologies, compared with terahertz generation by using a photoconduction element, generation band can be widened and the pulse width can be decreased in the case of terahertz pulse generation using the optical rectification. Therefore, it is expected that device performance can be enhanced in the case of application to a terahertz time domain spectroscope device, for example.

CITATION LIST

Patent Literature

PTL 1: Japanese Patent Application Laid-Open No. 2010-204488

Non Patent Literature

NPL 1: J. Opt. Soc. Am. B, vol. 25, pp. B6-B19, 2008.
NPL 2: Opt. Express, vol. 17, pp. 6676-6681, 2009.

SUMMARY OF INVENTION

Technical Problem

However, in the methods described in Non Patent Literature 1 and Non Patent Literature 2, only terahertz waves that are generated in part of directions among the terahertz waves generated in the crystal are extracted into the air. In Cerenkov radiation, terahertz waves are generated in every direction around the laser beam propagating in the crystal. Therefore, in the above-mentioned methods, terahertz waves obtained from the extraction surface are at most a half of the whole, and other part of the terahertz waves that cannot be extracted is absorbed and disappears in the nonlinear crystal. Therefore, extraction efficiency of the terahertz wave is limited. As described above, a sufficient technology has not been obtained at present about control of waveform shaping including an increase in the amplitude of the generated terahertz wave.

Solution to the Problem

In view of the above problem, in an aspect of the present invention, a terahertz wave generation element is provided, which includes: an optical waveguide including a core of electro-optic crystal; an optical coupler for extracting a terahertz wave generated from the optical waveguide when light propagates in the optical waveguide to a space; and a reflecting layer disposed on the opposite side to the optical coupler with respect to the core of the optical waveguide, so as to reflect the generated terahertz wave.

Advantageous Effects of Invention

According to the aspect of the present invention, it is possible to provide a generation element that can generate a relatively high intensity terahertz wave efficiently by photo-excitation or generate a terahertz wave having a relatively narrow pulse width, so as to flexibly control waveform shaping of the generated terahertz wave.

Other aspects of the present invention will become clear in the following description of embodiments.

Further features of the present invention will become apparent from the following description of exemplary embodiments with reference to the attached drawings.

DESCRIPTION OF EMBODIMENTS

A terahertz wave generation element including an electro-optic crystal according to the present invention controls waveform shaping of a generated terahertz wave by disposing a reflecting layer or a reflecting surface as described above, or by adopting a structure satisfying the Brewster condition. Based on this concept, a basic structure of the terahertz wave generation element according to the present invention has the structure described above. In addition, a terahertz wave can be detected by the same structure in the opposite process. Note that, the electro-optic crystal used here for a primary electrooptic effect has secondary nonlinearity, and in general, a practical electro-optic crystal is substantially equivalent to a nonlinear optical crystal having the secondary nonlinearity. If the generation element or the detection element having such a structure is used for a terahertz time domain spectroscope device or a tomography device that images the internal structure of a sample by analyzing reflection light from the sample, inside permeability thickness or depth resolution can be improved.

Hereinafter, embodiments and Examples are described with reference to the attached drawings.

Embodiment 1

Figure 1A:
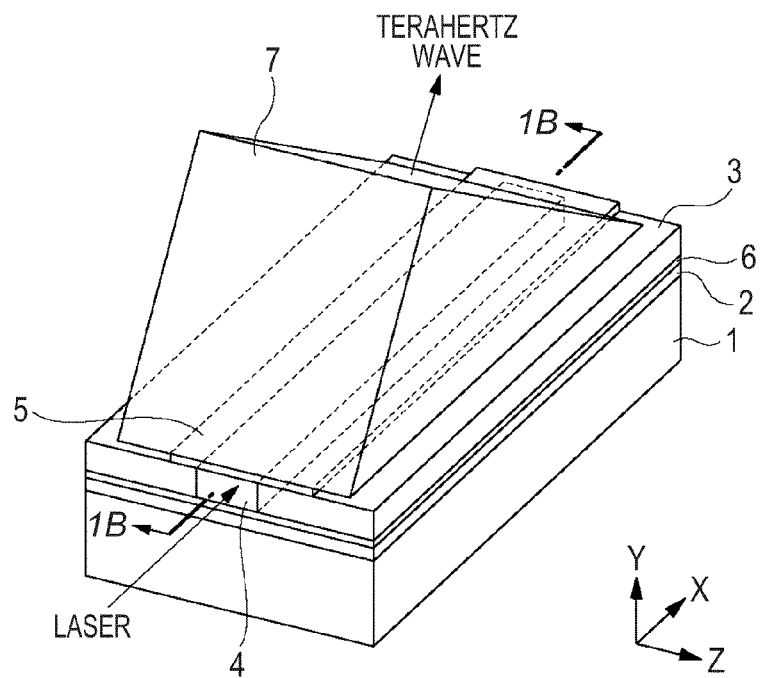
FIG. 1A is a structural diagram of a terahertz wave generation element according to Embodiment 1 and Example 1 of the present invention.
Figure 1B:
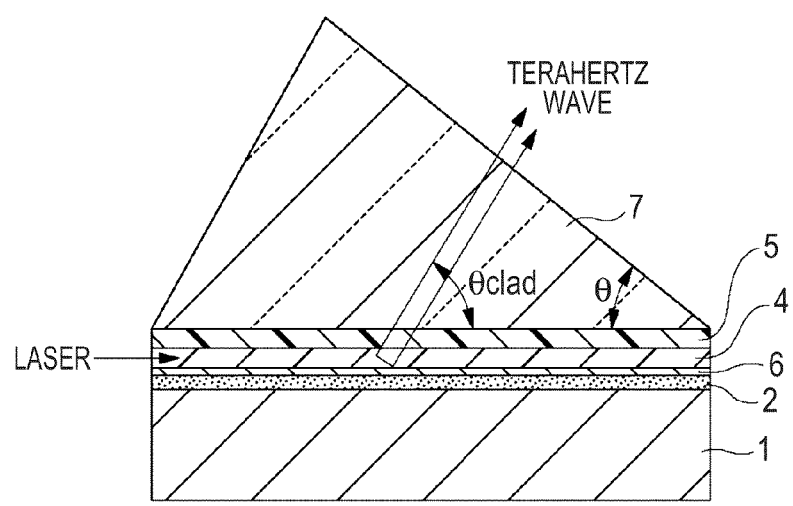
FIG. 1B is a structural diagram of the terahertz wave generation element according to Embodiment 1 and Example 1 of the present invention.

A terahertz wave generation element made of LN crystal according to Embodiment 1 of the present invention is described with reference to FIGS. 1A and 1B. FIG. 1A is a perspective view of the element according to this embodiment. FIG. 1B is an 1B-1B cross section of a waveguide part illustrated in FIG. 1A. An LN substrate 1 is a Y-cut lithium niobate substrate, in which a propagation direction of a laser beam is an X axis of the LN crystal, and the direction perpendicular to a Y axis and the propagation direction (X axis) is a Z axis (see the coordinate axes illustrated in FIG. 1A). With this structure, a terahertz wave can be generated efficiently by electrooptic Cerenkov radiation that is a secondary nonlinear phenomenon. In other words, the crystal axis is set so as to achieve phase matching between the terahertz wave generated by the secondary nonlinear process and propagation light so that a phase matching condition is satisfied between wave number vectors of light waves related to the secondary nonlinear process (terahertz wave and propagation light).

On the LN substrate 1, there is formed a waveguide by an upper clad 2 and a lower clad 5 and a core 4 made of MgO doped LN crystal layer, which propagates the incident laser beam by total internal reflection. In other words, the refractive index of each of the upper clad 2 and the lower clad 5 is set to be lower than that of the core 4. The lower clad 2 may also serve as an adhesive for bonding the core 4. Note that, although the adhesive 2 is necessary in the case where a bonding method is adopted for production, it is not always necessary in a case where a doped layer is formed by diffusion or the like. In this case, too, the refractive index of the MgO doped LN layer is higher than that of the LN substrate. Therefore, the substrate 1 becomes the lower clad 2 so that the waveguide works. In other words, the substrate 1 on the opposite side of a below mentioned optical coupler 7 may also serve as the lower clad, that is, it is possible to adopt a structure in which only the lower clad 2 is disposed. On the other hand, as a material of the upper clad 5, a resin or an inorganic oxide having a smaller refractive index than LN can be used suitably. The upper clad 5 may also serve as an adhesive for fixing the optical coupler 7.

The lateral structure of the waveguide can be formed by a method of realizing a high refractive index by Ti diffusion so as to set a refractive index difference with a peripheral region 3, or a method of forming the ridge shaped waveguide core 4 by etching and filling a resin or the like in the peripheral region 3. Here, in order to enhance light trapping, the waveguide structure is formed also in the lateral direction (Z axis direction) of the waveguide core 4. However, a slab waveguide may be adopted in which the core 4 extends uniformly in the lateral direction without light trapping regions. On the waveguide, there is disposed the optical coupler 7 for extracting the generated terahertz wave to the outside, such as a prism, a diffraction grating, or a photonic crystal (prism is illustrated in FIGS. 1A and 1B). A prism is a suitable optical coupler 7 because it can extract a wide band of terahertz waves.

Further, a reflecting layer 6 for reflecting the generated terahertz wave is formed between the waveguide core 4 and the lower clad 2. As the reflecting layer 6, optically transparent conductive film is used suitably so that optical propagation of the incident laser beam is performed normally. Such a film is made of ITO (InSnO), InO, SnO, ZnO, or the like. The reflecting layer 6 can be formed easily by vapor deposition on the surface before the MgO doped LN crystal layer is bonded. Alternatively, a mesh or a wire grid structure using thin metal wire and a resin may be used for constituting the reflecting layer 6. Thus, it is possible to transmit light and to reflect the terahertz wave effectively in the same manner. Other than that, a doped semiconductor layer, a resin, or a porous structure may be used. Further, a bored air spacer layer may be formed between the core 4 and the lower clad 2 so as to dispose a reflecting layer by Fresnel reflection on the bottom of the core. To sum up, the layer that can be generally used as a reflecting layer can also be used as the reflecting layer 6. If a carrier doped semiconductor layer is used, it is preferred to set the plasma frequency determined by its electron density and the like to a value higher than the highest frequency of the terahertz wave. The thickness of the reflecting layer only needs to be designed taking consideration of penetration length of the terahertz wave into the reflecting layer so that an appropriate reflection can be achieved.

When the laser beam enters the waveguide illustrated in FIG. 1A as a wave polarized in parallel to the Z axis, namely as a horizontally polarized wave so as to propagate along the X axis, a terahertz wave is generated from the surface of the crystal by optical rectification using the principle described in Non Patent Literature 2 mentioned in Background Art or using an ultrashort pulse light source. The generated terahertz wave can be extracted to the space via the optical coupler 7. The Cerenkov radiation angle determined by the refractive index difference between the light and the terahertz wave in LN is approximately 65 degrees. In the case of the prism 7, for example, high resistance Si having little loss of the terahertz wave is suitable as a material of the prism that enables to extract the terahertz wave to the air without total internal reflection in the waveguide. In this case, an angle $\theta_{clad}$ between the terahertz wave and the surface of the substrate (see FIG. 1B) is approximately 49 degrees. In this case, because the reflecting layer 6 exists, the terahertz wave radiated toward the substrate 1 is reflected and is also extracted to the outside as illustrated in FIG. 1B, and hence the extraction efficiency can be improved.

The thickness necessary for the core 4 is smaller than or equal to half the equivalent wavelength in the generation element with respect to the highest frequency of the terahertz wave to be extracted (that is, the thickness that does not cause phase inversion and cancellation due to the phase shift corresponding to the thickness of the core 4 after reflection concerning the equiphase wave surface of the generated terahertz wave). On the other hand, the thickness of the upper clad layer 5 is preferably large enough to serve as a clad layer when the laser beam propagates in the waveguide layer 4, and is preferably small to a certain extent that an influence of multiple reflection or a loss can be neglected when the terahertz wave is radiated to the outside through the optical coupler 7. As to the former, in the waveguide constituted of the waveguide layer 4 as a core and the low refractive layers 2, 5 as clads, it is preferred that the thickness be more than or equal to such a value that light intensity at the interface with the optical coupler 7 is $1/e^2$ or smaller of light intensity in the core region (e denotes the base of natural logarithm). Further, as to the latter, it is preferred that the thickness of the upper clad layer 5 be smaller than or equal to approximately 1/10 of an equivalent wave $\lambda_{eq}$ (THz) of the terahertz wave at the highest frequency to be radiated to the outside, in the low refractive index buffer layer 5. This is because in the structure having the size of 1/10 of the wavelength, an influence of reflection, dispersion, refraction, or the like of the electromagnetic wave having the wavelength can generally be neglected. However, even outside of the desirable thickness range described above, it is possible to generate a terahertz wave from the terahertz wave generation element of the present invention.

By setting the structure of the waveguide, the axial direction of the electro-optic crystal, the structure of the reflecting layer, and the like as described above, a terahertz wave can be generated efficiently at high intensity by photoexcitation and Cerenkov radiation.

Figure 2A:
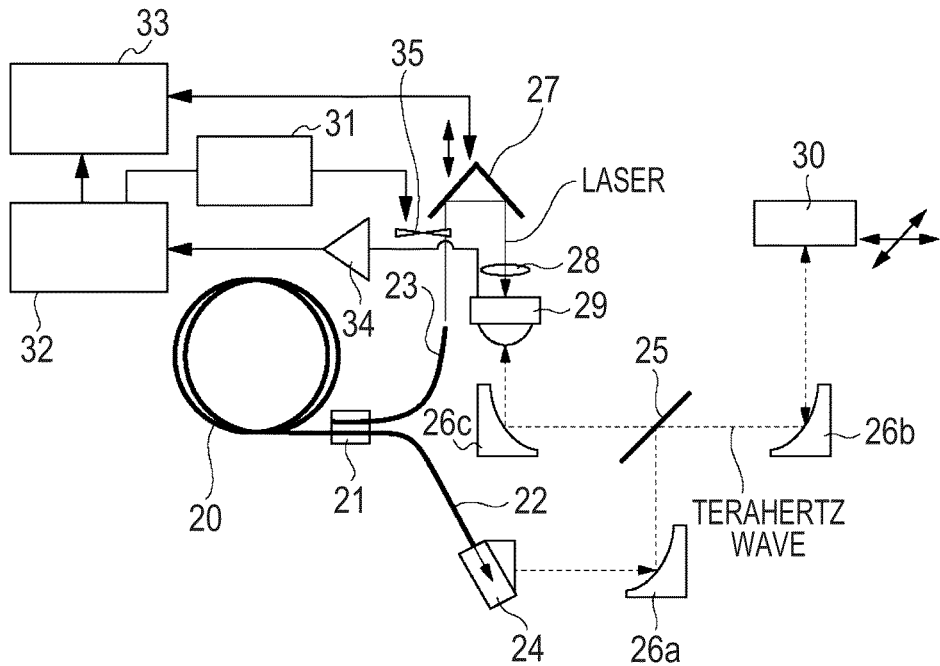
FIG. 2A is a block diagram of a tomography device according to an embodiment of the present invention.

An example of a tomography device employing a terahertz time domain spectral system (THz-TDS) using the above-mentioned element as the terahertz wave generation element is illustrated in FIG. 2A. Here, a femtosecond laser 20 including optical fiber is used as an excitation light source, and an output is extracted from a fiber 22 and a fiber 23 via an splitter 21. Typically, the center wavelength is 1.55 µm, the pulse width is 20 fs, and the repeating frequency is 50 MHz. However, the wavelength may be 1.06 µm band or the like, and the pulse width and the repeating frequency are not limited to the above-mentioned values. In addition, the fibers 22 and 23 in the output stage may include a highly nonlinear fiber for high order soliton compression in the final stage or a dispersion fiber that performs prechirp for compensating for dispersion due to optical elements from the terahertz wave generator to the detector. It is preferred that those fibers be polarization maintaining fibers.

The output from the fiber 22 on the terahertz wave generation side is coupled to the waveguide of a Cerenkov radiation type element 24 according to the present invention described above. In this case, it is preferred to integrate a Selfoc lens on the tip of the fiber or to form a pigtail type tip so that the output is equal to or smaller than the numerical aperture of the waveguide of the element 24, to thereby increase the coupling efficiency. Space coupling may be formed using a lens (not shown). In those cases, if non-reflective coating is formed on each end portion, it is possible to reduce fresnel loss and undesired interference noise. Alternatively, if it is designed so that NA and the mode field diameter of the fiber 22 are close to those of the waveguide of the element 24, direct coupling (butt coupling) by butting may be adopted for bonding. In this case, by selecting an adhesive appropriately, a bad influence of reflection can be reduced. Note that, if the fiber 22 or the fiber laser 20 in the front stage include a fiber portion that is not the polarization maintaining type, it is preferred to stabilize the polarization of incident light to the Cerenkov radiation type element 24 by an inline type polarization controller. However, the excitation light source is not limited to the fiber laser, and a countermeasure for stabilizing the polarization is reduced if the excitation light source is not a fiber laser.

The generated terahertz wave is detected by the structure using a known THz-TDS method illustrated in FIG. 2A. In other words, a parabolic mirror 26a forms a collimated beam, which is split by a beam splitter 25. One of the beams is applied to a sample 30 via a parabolic mirror 26b. The terahertz wave reflected by the sample 30 is condensed by a parabolic mirror 26c and is received by a detector 29 constituted of the photoconduction element. The photoconduction element is typically made of low temperature grown GaAs with a dipole antenna formed. If the light source 20 is 1.55 µm, SHG crystal (not shown) is used for generating a double wave as the probe beam of the detector 29 through a lens 28. In this case, in order to maintain a shape of the pulse, it is preferred to use periodically poled lithium niobate (PPLN) having a thickness of approximately 0.1 mm. If the light source 20 has a 1 µm band, it is possible to use the fundamental wave as the probe beam without generating the double wave in the detector 29 of the photoconduction element constituted of a single layer of InGaAs or MQW. In the device of this embodiment, for example, an optical chopper 35 is disposed on the probe beam side, and a modulation unit 31 for driving the chopper and a signal obtaining unit 32 for obtaining a detection signal from the detector 29 via an amplifier 34 are used so that synchronous detection can be performed. Then, a data processing and output unit 33 obtains the terahertz signal waveform while moving an optical delay module 27 as a delay unit by using a PC or the like. The delay unit may be any type as long as the delay unit can adjust the delay time between the time when the terahertz wave is generated in the element 24 as a generating unit and the time when the terahertz wave is detected in the detector 29 as a detecting unit. As described above, the device of this embodiment includes the generating unit including the terahertz wave generation element of the present invention for generating a terahertz wave, the detecting unit for detecting a terahertz wave radiated from the generating unit, and the delay unit. Further, the device of this embodiment is constituted as a tomography device, in which the detecting unit detects the terahertz wave radiated from the generating unit and reflected by the sample so that the reflection light from the sample is analyzed for imaging the inner structure of the sample.

Figure 2B:
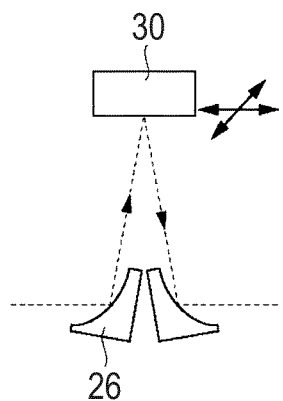
FIG. 2B is a block diagram of a part of the tomography device according to an embodiment of the present invention.

In the system illustrated in FIG. 2A, the reflection wave from the sample 30 to be measured and the irradiation terahertz wave are coaxial, and power of the terahertz wave is reduced by half due to existence of the beam splitter 25. Therefore, it is possible to increase the number of mirrors 26 to constitute a non-coaxial structure as illustrated in FIG. 2B, and to increase the power of the terahertz wave, though the incident angle to the sample 30 does not become 90 degrees.

Using the device of this embodiment, if there is a discontinuity of the material inside the sample 30, a reflection echo pulse appears at the temporal position corresponding to the discontinuity in the obtained signal. By scanning the sample 30 in a one-dimensional manner, a tomogram is obtained. By scanning the sample in a two-dimensional manner, a three-dimensional image can be obtained. With the structure of this embodiment, the terahertz wave of high intensity can be generated. Therefore, the permeability thickness in the depth direction of the sample 30 can be increased in the tomography, for example. In addition, because a relatively thin terahertz pulse of monopulse having 300 fs or smaller can be obtained, the resolution in the depth direction can be enhanced. Further, because the excitation laser using a fiber can be used as an irradiation unit, the size and cost of the device can be reduced. Here, while LN crystal is used herein as the material, $LiTaO_x$, $NbTaO_x$, KTP, DAST, ZnTe, GaSe, GaP, CdTe, and the like described above in Background Art can be used as other electro-optic crystals. In this case, LN has the refractive index difference between the terahertz wave and the excitation light as described above in Background Art, and the generated terahertz wave can be extracted in a non-collinear manner. However, because the difference is not always large in other crystal, there are some cases where the extraction is difficult. However, in the case where the terahertz wave generating part and the prism are close to each other in the waveguide type, if the prism having a higher refractive index than that of the electro-optic crystal (for example, Si) is used, the condition for the Cerenkov radiation ($v_{THz} < v_g$) is satisfied so that the terahertz wave can be extracted to the outside.

Example 1

Example 1 as a type of Embodiment 1 is described. In this example, in the element structure illustrated in FIGS. 1A and 1B, the lower clad 2 having a refractive index n of approximately 1.5 is formed by an optical adhesive having a thickness of 2 µm, and the MgO doped core 4 is formed to have a thickness of 3.8 µm and a width of 5 µm. In addition, the upper clad 5 is formed by the same optical adhesive as the lower clad 2 having a thickness of 2 µm. In this example, supposing to support up to 7 THz, for example, the wavelength in the free space is approximately 43 µm. Here, supposing that the core 4 has a refractive index of 2.2 (LN:MgO), and the upper clad 5 has a refractive index of 1.5, as described above in Embodiment 1, the thickness of the core 4 is designed to be ½ or smaller of the equivalent wavelength $\lambda_{eq\_core}$ (approximately 43/2.2=19.5). In other words, it is designed to be approximately 9.8 µm or smaller. In addition, the thickness of the clad is designed to be equal to or smaller than 1/10 of $\lambda_{eq\_clad}$ (approximately 43/1.5=28.7), namely 2.9 µm or smaller. Further, the prism 7 having the angle θ of FIG. 1B of 41 degrees made of high resistance Si is bonded. In this case, the angle θ and the radiation angle of the terahertz wave are approximately complementary angles to each other. The terahertz wave emerges from the inclined surface (emergence surface) of the prism 7 substantially in an orthogonal manner so that the transmittance becomes highest. However, θ is not always required to be 90-$\theta_{clad}$ and the emergence angle of the terahertz wave does not need to be orthogonal.

Figure 3A:
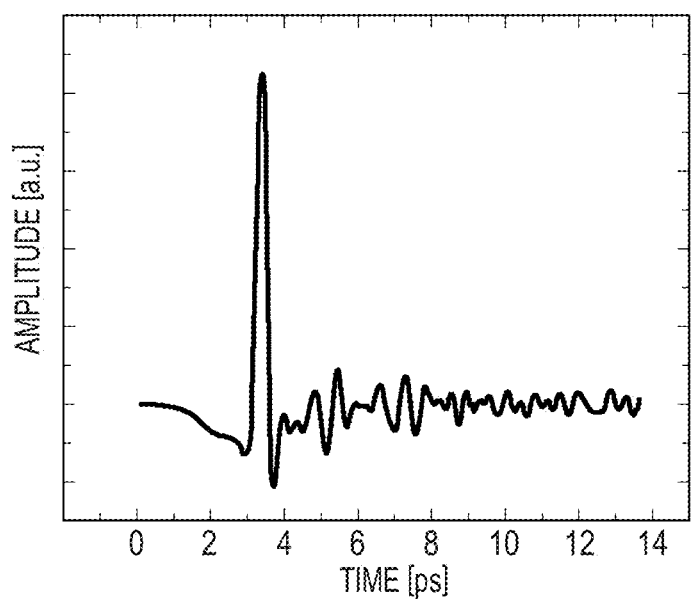
FIG. 3A is a graph illustrating an example of a terahertz pulse waveform of the tomography device according to the present invention.
Figure 3B:
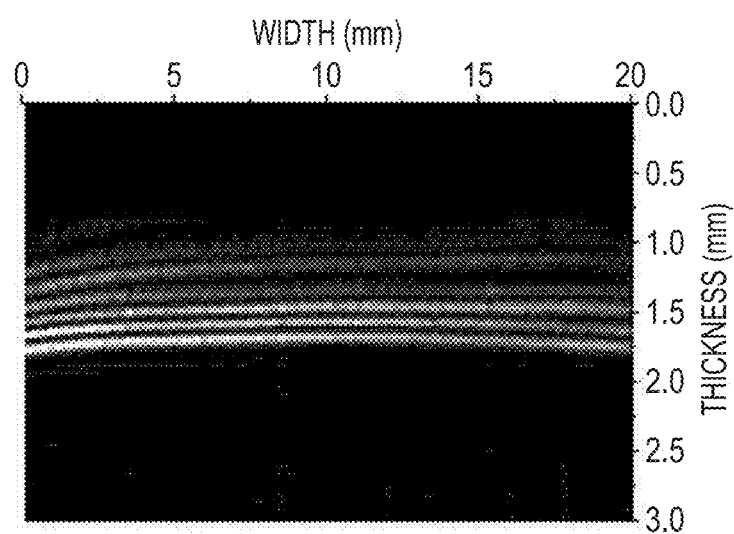
FIG. 3B is a diagram illustrating an example of a tomogram imaged by the tomography device of the present invention.

In this example, ITO (having a thickness of 100 nm) is used as the reflecting layer 6. In this case, the refractive index of ITO for light is approximately 2.2, which does not affect the propagating light so much concerning a loss, refraction, and the like. On the other hand, the reflectance for the terahertz wave can be 90% or higher. In this way, if the reflecting layer 6 is disposed close to the core 4, it is preferred that the refractive index for the light be substantially the same as the refractive index of the core or the clad, or a refractive index therebetween. FIGS. 3A and 3B respectively illustrate an example of the terahertz pulse waveform applied to the sample 30 and an example of the obtained tomogram in the system illustrated in FIGS. 2A and 2B. It is understood from FIG. 3A that the monopulse having a pulse width of approximately 270 fs was obtained. In addition, FIG. 3B is a tomogram which was obtained by scanning a sample of three stacked sheets of paper each of which has a thickness of approximately 90 µm, in one direction. Six layers (white lines) are observed because there are air gaps between the paper sheets so that front and rear sides of each paper sheet are observed as interfaces.

Example 2

Figure 4:
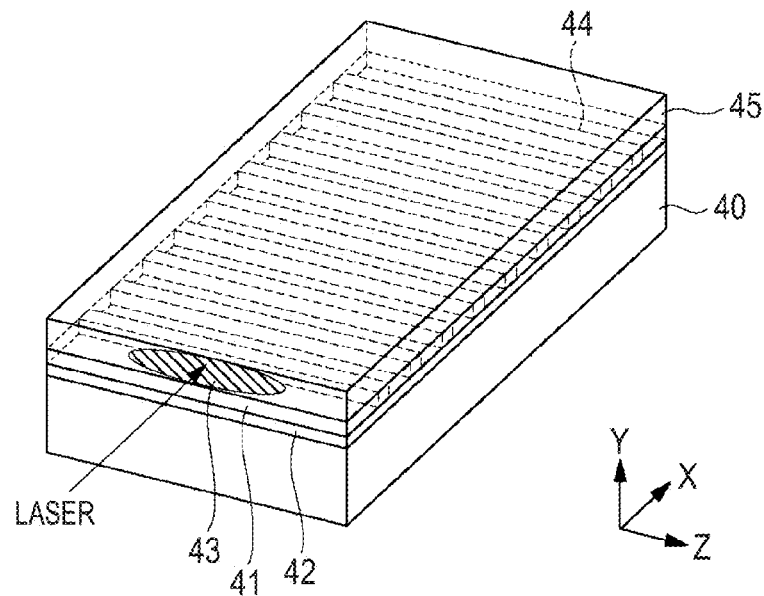
FIG. 4 is a structural diagram of a terahertz wave generation element according to Example 2 of the present invention.

Example 2 that is similarly a type of Embodiment 1 is described. In this example, a layer including a metal grid is used for the reflecting layer as illustrated in FIG. 4. In FIG. 4, a part up to a core 45 is illustrated, but the upper clad layer and the upper part are omitted so that the reflecting layer 41 can be seen easily. In addition, in this example, the waveguide is not a ridge shaped type but a slab waveguide type extending laterally beyond a laser beam irradiation region 43. A terahertz wave generation element illustrated in FIG. 4 includes an LN substrate 40, a resin adhesive 42 having a low refractive index to be a lower clad layer, the reflecting layer 41 having a grid-like metal pattern 44, and a core 45 as the MgO doped LN layer described above in Embodiment 1.

Here, the metal pattern 44 is made of Au having a thickness of 100 nm, a width of 10 μm, and an interval of 10 μm, for example. Such a grid is embedded in the resin layer so as to form the reflecting layer 41. In this case, the terahertz wave having an electric field component that is parallel to the grid is reflected, while interaction to the laser beam propagating in the waveguide is small. Instead of the grid, a metal mesh can be used. In general, the metal grid or the mesh structure has filter characteristics in a band from millimeter waves to terahertz waves. The width and the interval of the above-mentioned metal are designed so that the reflectance is 90% or larger for signal components up to 10 THz that are used here. In addition, the grid has a large dependence on polarization. Therefore, when the reflecting layer 41 of the metal pattern is used, the frequency spectrum and polarization of the generated terahertz wave can be adjusted.

Embodiment 2

Figure 5:
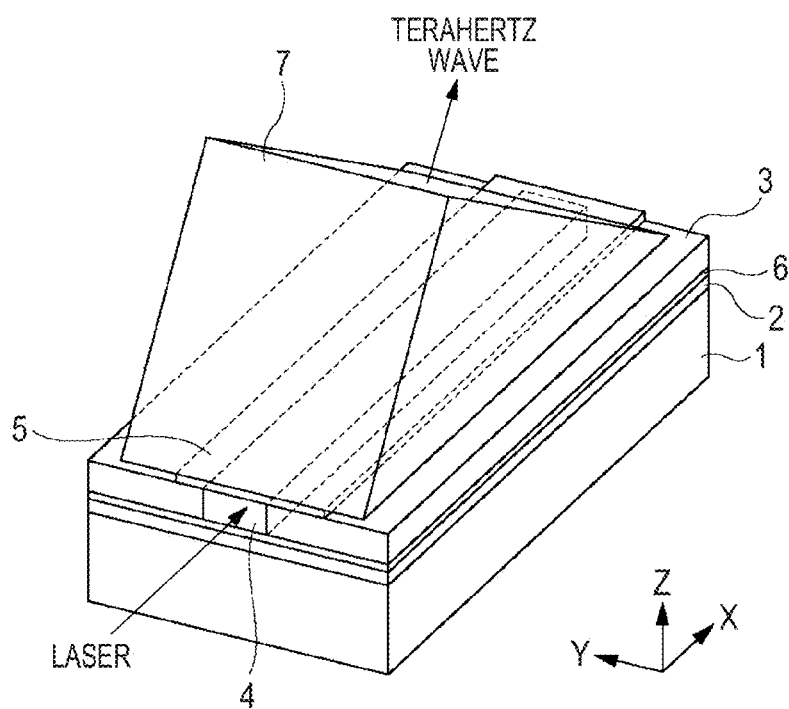
FIG. 5 is a structural diagram of the terahertz wave generation element according to Embodiment 2 of the present invention.

Embodiment 2 is described hereinafter. In this embodiment, the crystal axis of the core 4 constituted of the MgO doped LN crystal is changed as illustrated in FIG. 5. Other part of the structure is the same as that of Embodiment 1, and the same part is denoted by the same symbol. Since the Z axis is vertical, the polarization of the incident laser beam is also adjusted to be vertical, and the generated terahertz wave has polarization in the vertical direction. In this case, when a prism is used as the optical coupler 7, the polarization direction of the electric field of the terahertz wave becomes P polarization with respect to the emergence surface of the optical coupler 7, and hence light of P polarization enters. Therefore, if the emergence surface of the prism 7 forms a surface to have the Brewster angle with respect to the radiation direction of the terahertz wave, inner reflection can be prevented when the terahertz wave is extracted to the outside. Therefore, there is a merit that the transmittance can be increased without non-reflective coating or the like on the emergence surface.

In a case where the optical coupler 7 is made of Si, when the refractive index for the terahertz wave is 3.4, the Brewster angle is arctan(1/3.4)≠16 degrees. Therefore, in this case, the value of θ illustrated in FIG. 1B is adjusted to be 180−$θ_{clad}$−(90−16)=57 degrees. Then, the Brewster condition is satisfied so that the transmittance of the optical coupler 7 via the emergence surface for the terahertz wave becomes largest.

Note that, if the polarization direction of the generated terahertz wave satisfies the condition of this embodiment, the above-mentioned setting of the Brewster angle is valid also in the generation element having a structure without the reflecting layer 6, and hence the terahertz wave can be extracted to the outside while preventing the inner reflection.

Embodiment 3

Figure 6:
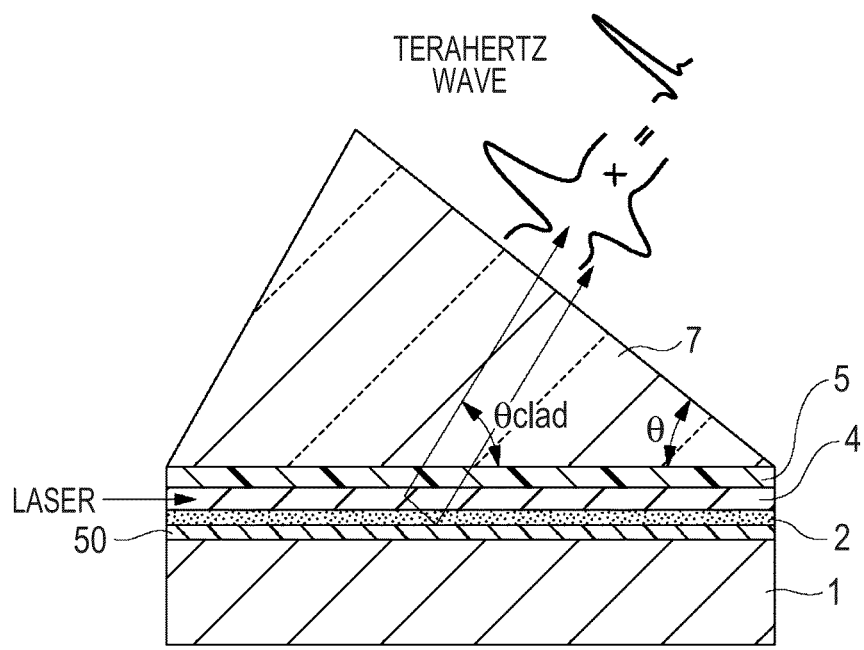
FIG. 6 is a structural diagram of a terahertz wave generation element according to Embodiment 3 of the present invention.

Embodiment 3 is described. In this embodiment, a reflecting layer (a layer forming the reflecting surface) 50 is disposed at a position apart from the core 4 as illustrated in FIG. 6. This reflecting surface is disposed on the opposite side to the optical coupler 7 with respect to the core 4 of the optical waveguide, at the position apart from the core 4 by a distance such that the amplitude of light propagating in the optical waveguide becomes $1/e^2$ or smaller of the amplitude of light in the core 4. Other structure is the same as that of Embodiment 1 except that the reflecting layer 6 is not provided, and the same part is denoted by the same numeral or symbol.

Here, there is a time difference between the component that is reflected with phase inversion at the interface of the clad layer 2 with the reflecting layer 50 and the component that is directly radiated without reflection. Thus, the combined wave of the components can be adjusted so as to have a part having a small pulse width compared with the case where the components are not combined, as illustrated in FIG. 6 as a concept. Therefore, the time of delay after reflection is set to approximately a half (e.g., 130 fs) of the original pulse width (here, 250 fs), for example. In this case, supposing that the position of the reflecting surface is substantially determined by the thickness d of the lower clad layer 2, the following equation holds.

$$2 \times d/\sin θc = 130 \times 10^{-15} \times c/n_2$$

where the refractive index of the lower clad layer 2 is denoted by $n_2$, the extraction angle of the terahertz wave determined by the refractive index difference (as described above in Background Art) is denoted by θc, and the light speed is denoted by c. The angle θc is 65 degrees for LN. When $n_2$=1.5, d is approximately 12 μm.

The reflecting layer 50 can be made of doped semiconductor, for example, an n type Si layer doped to $10^{17}$ cm$^{-3}$ or larger. Note that, because energy of light propagating in the light waveguide layer scarcely reaches to the layer, it is not necessary to take optical loss or the like into account. Therefore, the reflecting layer 50 may be made of a high refractive layer of TiO or the like, or a metal layer.

Embodiment 4

The embodiments/examples of generating a terahertz pulse by optical rectification using a femtosecond laser beam as excitation light are mainly described above. In contrast, in Embodiment 4, two laser beams having different oscillation frequencies $V_1$ and $V_2$ are allowed to enter, and a terahertz wave having a single color corresponding to the difference frequency is output. As a laser beam source, a KTP optical parametric oscillator (OPO) light source of Nd:YAG laser excitation (that outputs two wavelength light beams) or two variable wavelength laser diodes can be used.

Figure 7:
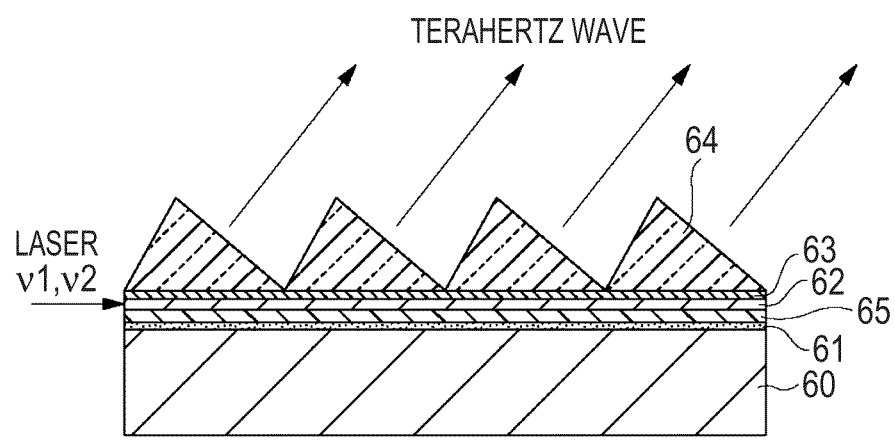
FIG. 7 is a structural diagram of a terahertz wave generation element according to Embodiment 4 of the present invention.

FIG. 7 is a cross sectional view of this embodiment. On an LN substrate 60, there are laminated an adhesive layer 61, a reflecting layer 65, an MgO doped LN waveguide layer 62, and a low refractive index buffer layer 63. Similarly to Embodiment 1, a waveguide having a width of 5 μm is formed. In this embodiment, in order to increase the output of the terahertz wave, the waveguide length is set to 40 mm, and a plurality of optical couplers 64 are disposed. Each of the optical couplers 64 has a length of approximately 1 cm, for example, and four optical couplers may be disposed as illustrated in FIG. 7. By constituting the optical coupler of a plurality of optical couplers 64, the entire volume thereof can be decreased, and a distance for the terahertz wave to pass through the optical coupler can be reduced so that a loss can be reduced. The material of the reflecting layer 65 is the same as that of Embodiment 1.

In this embodiment, when the frequency difference ↑$v_1$-$v_2$ of the incident light is 0.5 to 7 THz, the frequency of the radiated terahertz wave can be variable in the range. In this embodiment, it is possible to realize an application in which a frequency in a specific terahertz band can be used for inspection or imaging, for example, inspection of a content of a specific substance contained in a drug by adjusting the frequency to the absorption spectrum of the substance.

Embodiment 5

Figure 8:
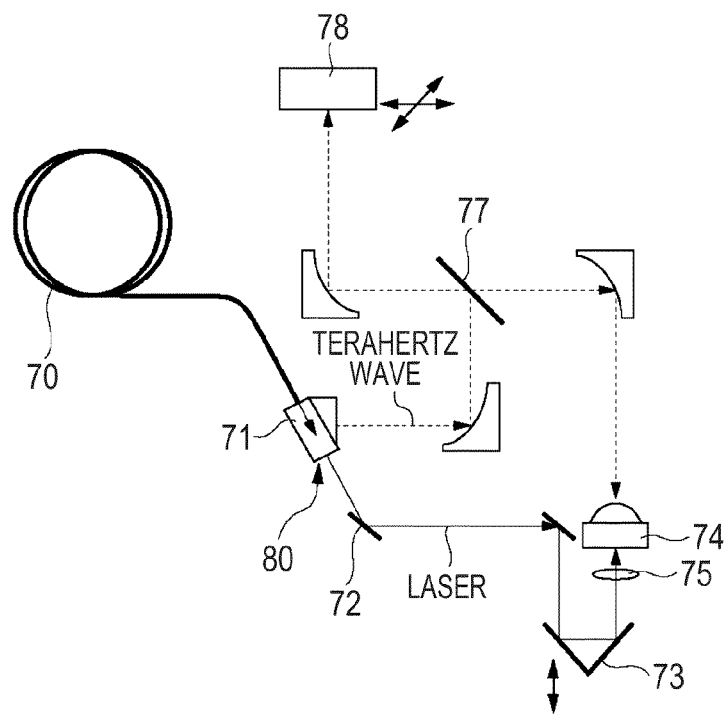
FIG. 8 is a block diagram of a tomography device according to Embodiment 5 of the present invention.
Figure 9:
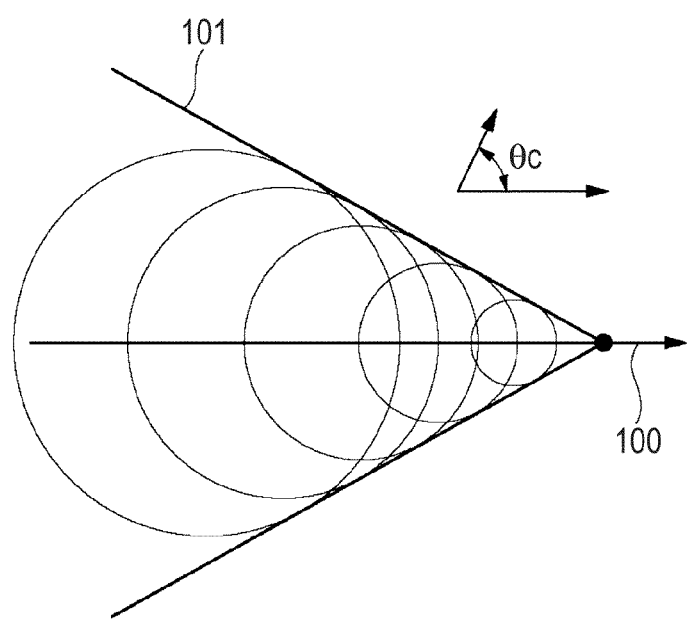
FIG. 9 is a conceptual diagram of electrooptic Cerenkov radiation.

In embodiments or examples described above, the termination of the optical waveguide of a terahertz wave generation element 71 made of LN illustrated in FIG. 8 is roughened or cut obliquely for extracting the light to the outside or is coated with AR coating, to thereby prevent light output from the termination from becoming a noise source. In contrast, in Embodiment 5, a termination 80 is cut obliquely or coated with AR coating or the like, to thereby reuse light output from the termination 80 as a probe beam. In other words, in this embodiment, light from the termination 80 of the optical waveguide of the terahertz wave generation element 71 is used as a probe beam to a detecting unit, and a delay unit adjusts delay time between arrival time of the light to the waveguide of the terahertz wave generation element 71 and arrival time of the probe beam to the detecting unit.

FIG. 8 is a diagram illustrating a tomography device of the THz-TDS method in the same manner as in FIGS. 2A and 2B, in which electric system parts are omitted. Unlike the embodiment illustrated in FIGS. 2A and 2B, a fiber splitter is not disposed, and the whole output of an excitation laser 70 including the fiber is allowed to enter the terahertz wave generation element 71. The terahertz wave generated from the terahertz wave generation element 71 is projected to a sample 78 via the parabolic mirror and a half mirror 77 similarly to the embodiment illustrated in FIGS. 2A and 2B. The reflection light from the sample 78 enters a terahertz detecting unit 74 so that a signal is obtained. On the other hand, a part of the laser beam that has propagated in the terahertz wave generation element 71 is output from the termination 80 again and is used as a probe beam for the detecting unit 74 via a mirror 72, a delay unit 73, and a lens 75.

In the case of this structure, since a splitter of the excitation laser beam is not necessary, the number of components can be reduced, and power of the excitation laser 70 can be efficiently used.

Embodiment 6

Figure 10:
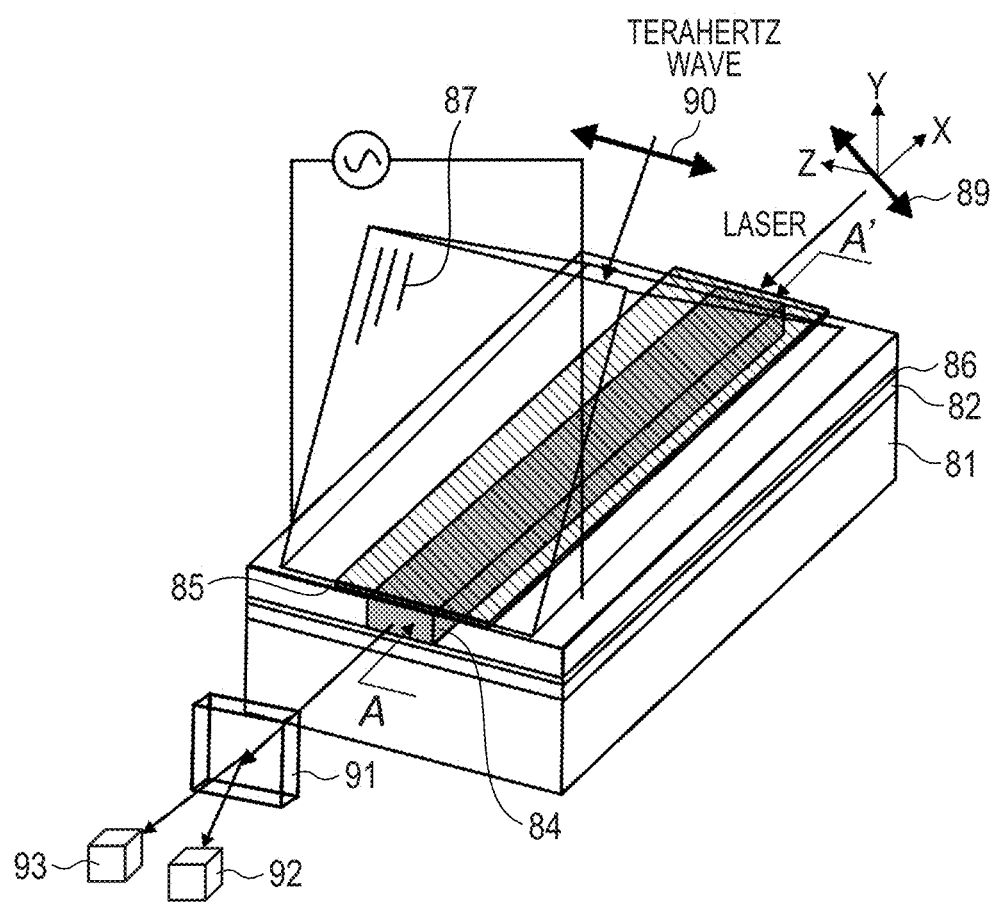
FIG. 10 is a structural diagram of a terahertz wave generation element according to Embodiment 6 of the present invention.

In this embodiment, the element having the same structure is used to serve as a detection element for a terahertz wave. Specifically, as illustrated in FIG. 10, a waveguide is formed of an adhesive layer 82, a reflecting layer 86, a waveguide layer 84 made of an MgO doped LN crystal layer, and a low refractive index buffer layer 85 on an LN substrate 81, for the incident laser beam to propagate by total internal reflection. Further, the structure includes an optical coupler 87 to which a terahertz wave enters. Here, an ultrashort pulse laser beam as a polarized light 89 having linear polarization is allowed to enter from the surface on the opposite side to the embodiment described above at an inclined angle (e.g., 45 degrees) from the Z axis of the crystal. In this case, the emitted laser beam has a phase difference between a Z axis component and a Y axis component of the electric field due to birefringence of the electro-optic crystal, so as to propagate as elliptically polarized light in the space after the emergence. This phase difference due to natural birefringence is different depending on a type of the crystal, the incident polarization direction, and the waveguide length. It is possible to set the phase difference to zero.

Here, if the polarized light of which the principal axis is the Z axis enters from the surface from which terahertz pulse emerges in Embodiment 1 or the like, by the optical coupler 87, for example, an Si prism, it is possible to perform, in the opposite process to generation of a terahertz wave, an interaction between the ultrashort pulse laser beam propagating in the waveguide and the terahertz wave over the entire waveguide. As the interaction, the refractive index of the waveguide changes in the Z axis due to a primary electrooptic effect given by a terahertz electromagnetic field to the electro-optic crystal (Pockels effect or one type of effect of the secondary nonlinear process), and hence the polarized state of the propagating light changes. Specifically, the phase difference between the Z axis component and the Y axis component of the electric field of the laser beam changes due to the induced birefringence, and hence ellipticity of the elliptical polarization and the direction of the principal axis change. The amplitude of the electric field of the terahertz wave can be detected by detecting this change in propagation state of the laser beam by an external polarization element 91 and photodetectors 92 and 93. In this embodiment, two polarized light beams are separated by the Wollaston polarizing prism 91, and an S/N ratio is improved by differential amplification of the two photodetectors 92 and 93. The differential amplification is not an absolute necessity. It is possible to use a polarization plate as the polarization element 91 so as to detect the intensity only by one photodetector (not shown).

It is possible to dispose a phase compensating plate ($\lambda/4$ plate or the like that is not shown) between the emergence end and the polarization element 91, for compensating for the natural birefringence.

By using the element of the present invention as the detector, it is possible to increase the terahertz wave that couples via the reflecting layer for terahertz wave that does not affect the propagating laser beam. As a result, sensitivity can be improved. Using this element, it is possible to realize the terahertz time domain spectroscope device and the tomography device as described above in the embodiments. The generation element in this case may be an element using a Cerenkov type phase matching method as in the present invention or any other element such as the conventional generation element using a photoconduction element or the like.

While in this embodiment the incident light enters from the end on the opposite side to the generation in this embodiment, it is also possible to adopt a structure in which the incident light enters from the end on the same side as the generation. In this case, because the matching length is decreased, the signal intensity is also decreased. While the optical waveguide has a ridge shape as in Example 1, it is also possible adopt a slab waveguide as in Example 2. In addition, while in this embodiment the terahertz pulse is detected by the pulse laser beam, it is also possible to allow two laser beams having different frequencies to enter as described above in Embodiment 4, so as to detect the terahertz wave of a single color corresponding to the difference frequency component. In this case, by changing the difference frequency, it is possible to extract a desired frequency of terahertz wave in the same way as a filter so as to detect the amplitude of the electric field.

In the method of detecting a terahertz wave described herein, a change in polarization state of light due to the primary electrooptic effect by the coupled terahertz wave is detected. However, it is possible to adopt a method of detecting a phase change of light propagating in the waveguide as a change in the propagation state of light, or a light signal having a frequency that is a difference between the frequency of light propagating in the waveguide and the frequency of the coupled terahertz wave, namely a light beat signal.

Embodiment 7

Figure 11A:
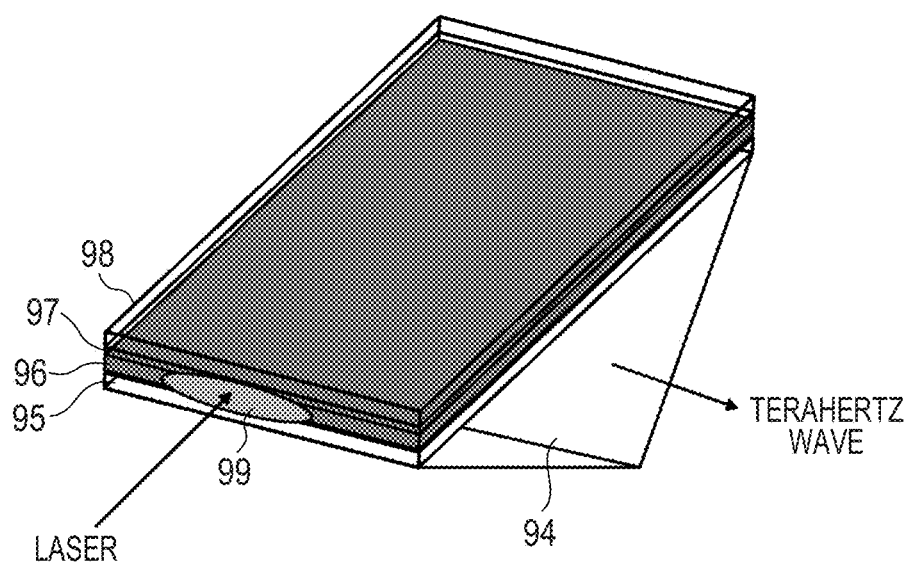
FIG. 11A is a structural diagram of a terahertz wave generation element or a terahertz wave detection element according to Embodiment 7 of the present invention.
Figure 11B:
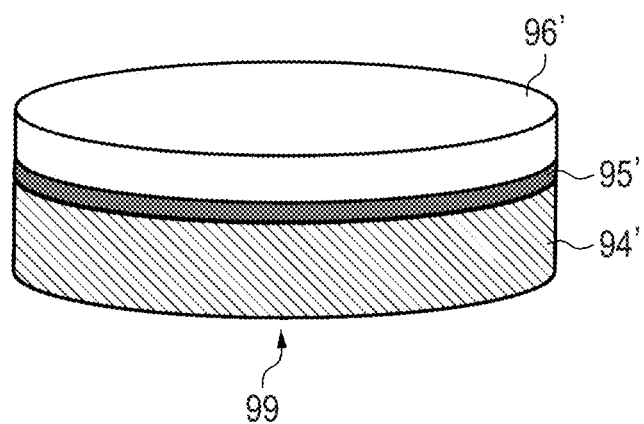
FIG. 11B is a diagram illustrating a method of manufacturing a terahertz wave generation element or a terahertz wave detection element according to an embodiment of the present invention.

Embodiment 7 of the present invention is described with reference to FIGS. 11A and 11B. In this embodiment, a waveguide layer 96 in which the laser beam propagates is a sandwich type slab waveguide having a structure without the LN substrate for holding the waveguide layer. The length of the waveguide is 5 mm, for example. Note that, FIGS. 11A and 11B illustrate diagrams in which an adhesive layer 95 and a prism 94 are on the lower side unlike in FIGS. 1A and 1B.

This can be realized as follows. As illustrated in FIG. 11B, using an adhesive to be a low refractive index buffer layer 95' (similar to Embodiment 1), an MgO doped LN crystal substrate 96' to be the waveguide layer is bonded to a high resistance Si substrate 94', which is a material of the prism 94. Then, the LN crystal side is polished to be the thickness of the waveguide layer so as to prepare a laminated wafer 99. After the polishing process, it is preferred to form an optically transparent conductive film 97 to be the reflecting layer as described above in Embodiment 1 and a low refractive layer 98 made of an oxide film made of SiO2 or the like, a resin, or the like that also works as a protection film on the surface. Even if this low refractive layer 98 is not formed, it is possible to trap light in the waveguide layer because the refractive index of air is low.

The inclined part of the Si prism should be formed by polishing or chemical etching. For instance, if the surface is a (100) Si substrate, a (111) surface with an inclination of 55 degrees is formed by performing known wet etching (KOH or the like). Although the value deviates from the ideal surface with an inclination of 41 degrees by 14 degrees, an increase of a reflection loss (fresnel loss) on the surface is very small. Of course, it is possible to use an inclined substrate so as to realize the surface with an inclination of 41 degrees.

Here, the incident light may be elliptically shaped light like the laser beam irradiation region 43 in FIG. 4. In this case, a rod-like lens or a cylindrical lens may be used as the lens for coupling to the laser beam source so as to narrow the waveguide layer structure in the vertical direction.

A method of generating or detecting the terahertz wave is the same as that in embodiments 1 to 6.

In this embodiment, because the slab waveguide is adopted, there is a merit that the probe beam can be easily coupled as well as a merit that a wide interaction region can be secured even if the terahertz wave cannot be sufficiently condensed. Of course, it is possible to adopt a ridge waveguide also in the case where the waveguide is formed from the bonded state to a Si substrate.

Although preferred embodiments of the present invention are described above, the present invention is not limited to those embodiments, which can be modified or changed variously in the scope of the spirit thereof. In addition, technical elements illustrated in the specification or the drawings exhibit the technical usefulness alone or in various combinations thereof, without limiting to the combinations described in claims as filed. In addition, the technology exemplified in the specification or the drawings achieves a plurality of objects simultaneously, and achieving one of them has the technical usefulness.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-127891, filed Jun. 3, 2010, No. 2011-104803, filed May 10, 2011 which are hereby incorporated by reference herein in their entirety.

REFERENCE SIGNS LIST 2, 5 clad
4 core
6 reflecting layer
7 optical coupler

The invention claimed is:

1. A terahertz wave generation element comprising:
   an optical waveguide including a core containing an electro-optic crystal;
   an optical coupler for extracting a terahertz wave generated from the core when light propagates in the optical waveguide to a space;
   a reflecting layer disposed on a side of the core that is opposite to a side of the core on which the optical coupler is disposed, so as to reflect the generated terahertz wave; and
   a substrate upon which the core, the optical coupler, and the reflecting layer are disposed,
   wherein the reflecting layer is disposed between the core and the substrate and is in contact with the core.

2. The terahertz wave generation element according to claim 1, wherein the reflecting layer is an optically transparent conductive film that transmits the light.

3. The terahertz wave generation element according to claim 2, wherein the reflecting layer contains at least one of ITO (InSnO), InO, SnO, and ZnO.

4. The terahertz wave generation element according to claim 1, wherein:
   the optical waveguide includes a high refractive layer to be the core and low refractive layers to be a clad, with respect to the light;
   the clad is disposed between the high refractive layer and the optical coupler so as to contact the high refractive layer and the optical coupler; and
   a thickness d of the clad satisfies the following expression:

$$a < d < \lambda_{eq}/10$$

where a thickness at which an intensity of the light becomes $1/e^2$, where e is the base of natural logarithms, of light intensity in the core is denoted by a, and an equivalent wavelength in the clad at a highest frequency of the terahertz wave to be extracted to the space is denoted by $\lambda_{eq}$.

5. A terahertz time domain spectroscope device comprising:
   a generating unit for generating a terahertz wave;
   a detecting unit for detecting the terahertz wave radiated from the generating unit; and
   a delay unit for adjusting delay time between a time at which the terahertz wave is generated in the generating unit and a time at which the terahertz wave is detected in the detecting unit,
   wherein the generating unit includes the terahertz wave generation element according to claim 1.

6. The terahertz time domain spectroscope device according to claim 5, wherein:
   light from an optical waveguide termination of the terahertz wave generation element is used as a probe beam to the detecting unit; and
   the delay unit adjusts delay time between a time at which the light reaches the optical waveguide of the terahertz wave generation element and a time at which the probe beam reaches the detecting unit.

7. The terahertz wave generation element according to claim 1, wherein the reflecting layer is a total reflection layer that totally reflects the generated terahertz wave.

8. The terahertz wave generation element according to claim 1, wherein the reflecting layer does not consist of air.

9. The terahertz wave generation element according to claim 1, wherein the reflecting layer comprises a solid material.

10. The terahertz wave generation element according to claim 1, wherein the optical waveguide has a waveguide structure for enhancing light trapping in a first direction (Y) which is perpendicular to the direction of light propagation (X) and in a second direction (Z) which is perpendicular to the direction of light propagation and also to the first direction.

11. The terahertz wave generation element according to claim 1, wherein the reflecting layer is longer than the core in a second direction (Z) which is perpendicular to the direction of light propagation (X) and also to a first direction (Y) in which the core and the reflecting layer face each other.

12. The terahertz wave generation element according to claim 1, wherein the reflecting layer has a reflectance for the terahertz wave of 90% or higher.

13. A terahertz wave generation element comprising:
an optical waveguide including a core containing an electro-optic crystal;
an optical coupler for extracting a terahertz wave generated from the core when light propagates in the optical waveguide to a space; and
a reflecting layer disposed on a side of the core that is opposite to a side of the core on which the optical coupler is disposed, so as to reflect the generated terahertz wave,
wherein the reflecting layer has a refractive index for the light, the refractive index being the same as a refractive index of the core or a clad of the optical waveguide, or the refractive index has a value within a range between refractive indexes of the core and the clad.

14. A terahertz wave generation element comprising:
an optical waveguide including a core containing an electro-optic crystal;
an optical coupler for extracting a terahertz wave generated from the core when light propagates in the optical waveguide to a space; and
a reflecting layer disposed on a side of the core that is opposite to a side of the core on which the optical coupler is disposed, so as to reflect the generated terahertz wave,
wherein the reflecting layer is a layer including a metal mesh or a wire grid, or is a layer containing a carrier-doped semiconductor.

15. A terahertz wave detection element comprising:
an optical waveguide including a core containing an electro-optic crystal;
an optical coupler for allowing a terahertz wave to enter the optical waveguide from a space;
a reflecting layer disposed on a side of the core that is opposite to a side of the core on which the optical coupler is disposed, so as to reflect the entered terahertz wave; and
a substrate upon which the core, the optical coupler, and the reflecting layer are disposed,
wherein the electro-optic crystal of the core has a crystal axis that is set so that a propagation state of light propagating in the waveguide is changed when the terahertz wave enters the waveguide, and
wherein the reflecting layer is disposed between the core and the substrate and is in contact with the core.

16. A terahertz time domain spectroscope device comprising:
a generating unit for generating a terahertz wave;
a detecting unit for detecting a terahertz wave radiated from the generating unit; and
a delay unit for adjusting delay time between a time at which the terahertz wave is generated in the generating unit and a time at which the terahertz wave is detected in the detecting unit,
wherein the detecting unit includes the terahertz wave generation element according to claim 15.

17. The terahertz time domain spectroscope device according to claim 16, wherein:
the detecting unit detects a terahertz wave radiated from the generating unit and reflected by a sample; and
the terahertz time domain spectroscope device is constituted as a tomography device for imaging inner structure of the sample by analyzing the reflection light from the sample.

18. The terahertz time domain spectroscope device according to claim 16, wherein:
light from an optical waveguide termination of the terahertz wave generation element is used as a probe beam to the detecting unit; and
the delay unit adjusts delay time between a time at which the light reaches the optical waveguide of the terahertz wave generation element and a time at which the probe beam reaches the detecting unit.

\* \* \* \* \*